Feb. 17, 1948. W. L. ZINK 2,435,993
FISH LURE
Filed Sept. 29, 1943
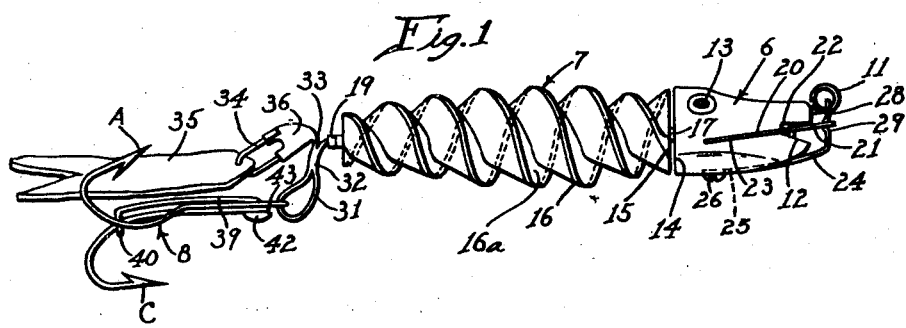
Fig. 1
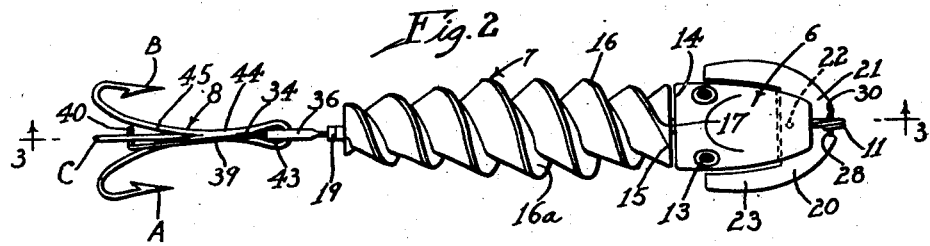
Fig. 2
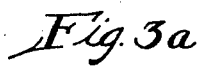
Fig. 3a
3a
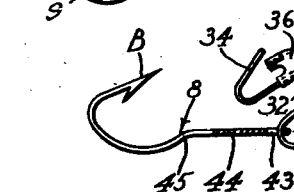
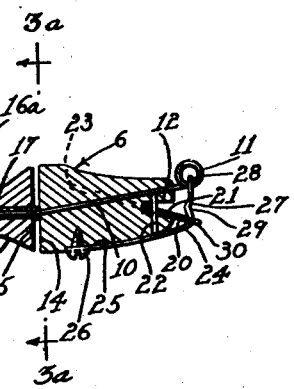
Fig. 3
Fig. 7
Fig. 5
Fig. 4
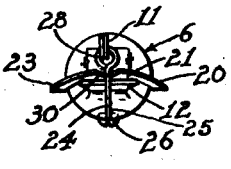
Fig. 6
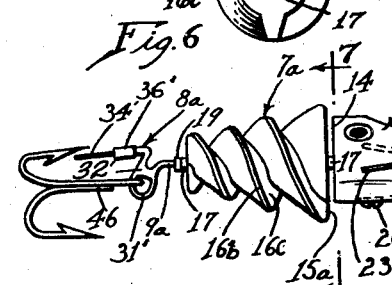
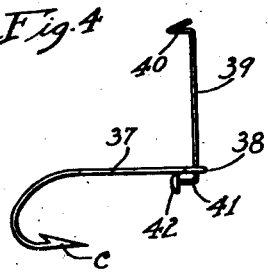
Inventor:
Walter L. Zink
By McCanna, Wintercorn
& Morsbach attys.

Patented Feb. 17, 1948

2,435,993

UNITED STATES PATENT OFFICE 2,435,993

FISH LURE

Walter L. Zink, Dixon, Ill.

Application September 29, 1943, Serial No. 504,207

9 Claims. (Cl. 43—47)

This invention relates to a new and improved fish lure.

The fish lure of my invention has been designed so as to combine in a comparatively simple structure means to give various desirable characteristics, such as the spinner action and darting action, both of which are calculated to attract the attention of the fish, together with means whereby the device can be made to ascend or descend when drawn through the water for surface or near suface fishing or deep water fishing, and means for attaching a bit of pork strip, a minnow, or other bait, in the most advantageous relationship to a three-pronged hook disposed in trailing relation to the spinner body. The fish lure is, therefore, adaptable to various kinds of fishing, as distinguished from other devices which are practically single-purpose baits.

The spinner body in accordance with my invention is made with a double thread helix of comparatively small pitch and accordingly relatively many turns, and is rotatably mounted on the longitudinally extending center shaft of the device to turn freely with respect to the head fixed on the front end of the shaft, the helix being of novel substantially buttress design for the best purchase on the water, so as to insure the desired speed of turning in the usual speed of movement of the device through the water in casting or trolling.

The rear end of the longitudinally extending shaft in accordance with my invention has a loop portion thereon, bent downwardly in relation to the rear end of the spinner body so that the three-pronged hook attached thereon lends stability and there is less tendency for the bait to revolve as a whole as it is pulled through the water. The bait carrying hook is on the rear end of the shaft above the looped portion, to trail the pork strip or other bait more or less on the center line of the shaft between the upper two prongs of the three-pronged hook, so that the bait tends to lend stability and at the same time is best situated with respect to the hook for best results.

The invention is illustrated in the accompanying drawing, in which—

Figs. 1 and 2 are, respectively, a side view and top view of a fish lure made in accordance with my invention, Fig. 1 illustrating the manner of attachment of a pork strip or other bait;

Fig. 3 is a longitudinal section on the line 3—3 of Fig. 2 with the detachable prong removed;

Fig. 3a is a cross-section on the line 3a—3a of Fig. 3;

Fig. 4 is a side view of the detachable prong assembly by itself;

Fig. 5 is a front end view of the fish lure of Figs. 1–3;

Fig. 6 is a side view of another fish lure made in accordance with my invention, and Fig. 7 is a cross-section on the line 7—7 of Fig. 6.

Similar reference numerals are applied to corresponding parts throughout the views.

The fish lure illustrated in Figs. 1–3 comprises a head 6, a spinner body 7, and tail hook assembly 8, all interconnected by a longitudinally extending shaft 9, the front end portion 10 of which extends through the head 6 with a drive fit and has an eye 11 formed on the extremity thereof for attachment of the fish lure to the leader or line by means of which the lure may be drawn through the water, as in casting or trolling. The head 6 which may be of wood or a molded plastic or composition material is notched in the front end, as at 12, to simulate a mouth, and there are eyes 13 suitably painted on the head, so that the fish lure when drawn through the water will resemble a small fish, the body 7 being elongated and of substantially circular cross section and largest in diameter in the intermediate portion to further simulate the contour of a small fish. The head 6 is cut off squarely at the back thereof, as as 14, and the circle thus defined is of substantially the same radius as the substantially circular front end 15 of the body. The body 7 is made of wood, or any suitable plastic or composition material, and has a double-thread helix formed on the periphery thereof, as indicated at 16. The threads 16 are of small pitch so that there may be at least four complete turns within the length of the body, as shown. The threads are substantially of a buttress type and fairly deep so that wide flat front surfaces 16a are presented for a better purchase on the water. This combination of a double substantially buttress thread of many turns, suitable pitch, and substantial depth insures a better purchase on the water than has been afforded heretofore in other fish lures where a spinner action was intended, and, as a result, spins fast enough when drawn through the water at the usual speed in casting or trolling to really attract the attention of fish in the vicinity. Small elongated brass bushings 17 are pressed into the opposite ends of the longitudinally extending axial hole 18 to support the spinner body on the shaft 9 for easy rotation. The front bushing projects slightly from the front end of the body and serves to space the front end from the head to insure easier operation. The rear bushing also projects from the body and spaces it from the shouldered portion 19 provided on the shaft 9 behind the spinner body.

A sheet metal vane 20, which is generally U-shaped, has the cross-portion 21 thereof entered in the notch 12 and loosely secured in place by a vertical pin 22 driven into the front end portion of the head and passed through a hole provided therefor in the vane. The arms 23 of the vane are disposed on opposite sides of the head and serve as blades, which in the inclination of the vane from a horizontal in one direction, as shown in Fig. 1, give the lure an ascending motion as it is pulled through the water. However, when the vane is tilted in the opposite direction, as indicated in Fig. 3, these blades cause the lure to dive as the lure is pulled through the water. A spring wire catch 24 is inserted in a longitudinally extending groove 25 provided in the bottom of the head 6 and has the rear end thereof looped to receive a fastening screw 26. The front end portion 27 of the wire is bent upwardly and an eye 28 is formed on the extremity thereof and entered in the eye 11, so that there is no opening left into which weeds or trash is apt to enter in the movement of the lure through the water. The upright end portion 27 of the wire is bent rearwardly below the eye 28, as at 29, to provide a spring catch portion, which when disposed above the notched front end 30 of the vane, as in Fig. 3, serves to hold the vane in the one position of adjustment, and which when disposed below the notched portion 30, as in Fig. 1, serves to hold the vane in the other position of adjustment. The bend is so slight at 29 and the spring wire 24 yields easily enough that the operator can easily move the vane from one position to the other, the bent portion 29 being flexed outwardly as the vane is slid from one side thereof to the other with an oscillating motion relative to the pin 22 on the notch 12. The lure can, therefore, be used for surface or near surface fishing or deep water fishing by merely setting the vane for the kind of fishing desired, and inasmuch as there are no screws or other parts to loosen or remove, the change from one position to the other can be made easily at the fishing spot and there is no danger of a necessary part being dropped into the bottom of the boat or into the water and possibly lost. The vane 20 in addition to serving as an elevator means serves to give the lure a darting motion, and when the lure is used on the surface the ripple which the vane creates is especially desirable from the standpoint of attracting the attention of fish.

The rear end portion of the shaft 9 is bent downwardly and upwardly to form a loop 31 for attachment of the hook assembly 8, the loop being closed, as at 32, by soldering or in any other suitable manner for a permanent connection with the hook assembly, and the free end portion 33 of the shaft being bent rearwardly and downwardly to form the shank of a hook 34 onto which a strip of pork may be attached, as indicated at 35 in Fig. 1, or a minnow, or other bait. The hook 34 being in the same vertical plane with the loop 31 will trail the bait between the prongs A and B that project upwardly, as clearly appears in Figs. 1, 2, and 3, thus increasing the likelihood of hooking a fish grabbing at the bait 35. The bait 35 gives off a scent which greatly increases the chances of catching certain kinds of fish, although the lure may be used with or without the bait, depending on the kind of fishing being done. The hook 34 has a safety-pin type of clasp or keeper 36 releasably to hold the same closed, as shown in Fig. 1. The hook is shown opened in Fig. 3, ready for threading the bait thereon.

The hook assembly 8 may be a conventional three-pronged hook or a two-pronged hook having prongs A and B, but I prefer to provide a removable third prong C, because in deep water fishing in certain waters where there is a lot of weeds, the downwardly projecting prong C might prove objectionable and interfere with working the lure close enough to the fish at the bottom, whereas the two upwardly projecting prongs A and B under such conditions would not be apt to get caught on the weeds. In surface or near surface fishing, there is, of course, no reason for dispensing with the third prong, and, hence, the facility for change-over from two to three prongs, or vice versa, makes the lure of much more value to an all-around fisherman. The removable prong C, as shown in Fig. 4, has the end of the shank 37 thereof provided with an eye 38 to receive a latch pin 39. One end of the latch pin has a hook 40 thereon bent substantially at right angles, and the other end 41 is bent at right angles and upset to provide a head 42. The latch pin 39 is preferably made of spring steel wire, similar to that used in the hooks themselves, and is adapted to be flexed to the extent indicated in Fig. 1 to grip the shank of the prong C with its hooked end 40 while the other end of the pin holds the eye end 38 of the prong firmly between the head 42 on the pin and the eye 43 on the end of the shank 44 carrying the two prongs A and B. The prong C is held against lateral movement by engagement of its hooked end portion in the crotch 45 defined between the prongs A and B.

The lure of Fig. 6 is closely similar to that of Figs. 1-3. It is smaller and, hence, more suitable for catching bass, crappies, and other smaller fish, whereas the larger lure of Figs. 1-3 is better suited for catching muskellunge and other larger sized fish. This smaller lure has a spinner type body 7a that is not only shorter than the other body 7 but of different shape, being generally conical in form with its large end toward the head 6a and its small end toward the tail assembly 8a. The double substantially buttress thread 16b is like that on the other body 7 with a view to the same efficiency of spinning operation, and the ends of these threads at the forward end 15a of the body project radially outwardly from the head 6a so that their flat front faces 16c have the full force of the water brought to play thereon as the lure is pulled through the water to spin the body 7a at the desired speed. Otherwise this lure is of substantially the same construction and operates about the same way as the other one, except that the triple hook 46 shown on this lure is of conventional form. The eye 47 for attachment of the lure to the line or leader is formed on the downwardly bent front end of the longitudinally extending shaft 9a and is substantially on the longitudinal center line of the lure to reduce likelihood of the lure turning as a whole as it is pulled through the water. The loop 28a on the end of the wire 24a encircles the shaft 9a behind the eye 47. The vane 20a on this lure is the same as on the other lure, being adjustable in the same way for the same purpose. It is shown in full lines in the position for surface or near surface operation, and in dotted lines in the other position for deep water operation. Shaft 9a is shown as having a loop 31' closed, as at 32', by soldering or in any other suitable manner for a permanent connection with the hook 46, and as also having in a horizontal plane a hook 34' and keeper 36' similar to hook 34 and keeper 36 for trailing a piece of bait between the two laterally spaced upwardly projecting prongs of the triple hook 46, similarly as in the construction disclosed in Figs. 1 to 3.

It should be clear from the foregoing description that I have provided a fish lure of relatively simple and inexpensive construction, and one which affords a wide range of fishing and can be quickly and easily adjusted for fishing on or near the surface or in deep water. The combination of the spinner action with the darting action greatly increases the likelihood of attracting the attention of the fish, and, in many instances, the addition of a pork strip or other bait to give off a scent greatly increases the effectiveness of the lure.

I claim:

1. A fish lure comprising a longitudinally extending through shaft, a suitably enlarged head fixed on the front end portion of the shaft, an elongated externally threaded spinner body mounted for rotation on its longitudinal axis on the shaft behind the head, said threaded spinner body being of such shape that any section on a plane including the longitudinal axis will define a contour wherein the portion representing each thread will appear as a line substantially perpendicular to said longitudinal axis and a line inclined relative to the first line at a substantial angle to said axis, said spinner body being disposed so that the substantially perpendicular faces of the threads are on that side toward the head, whereby to cause the spinner body to turn at an appreciable speed when the lure is drawn through the water, and fish hook means relative to which the spinner body turns attached to the rear end portion of the through shaft behind said spinner body.

2. A fish lure comprising a longitudinally extending through shaft, a suitably enlarged head fixed on the front end portion of the shaft, the back wall surface of the head being flat and disposed in a plane substantially normal to the shaft, an elongated externally threaded spinner body mounted for rotation on its longitudinal axis on the shaft behind the head, said threaded spinner body being of such shape that any section on a plane including the longitudinal axis will define a contour wherein the portion representing each thread will appear as a line substantially perpendicular to said longitudinal axis and a line inclined relative to the first line at a substantial angle to said axis, said spinner body being disposed so that the substantially perpendicular faces of the threads are on that side toward the head, whereby to cause the spinner body to turn at an appreciable speed when the lure is drawn through the water, the front end portion of said spinner body having a flat end wall surface substantially normal to the axis of said body and corresponding in extent to the back wall surface of the head and which has extending therefrom substantially in the plane of the end wall surface an end portion of a thread which is of greater width than the maximum width of the head, and fish hook means relative to which the spinner body turns attached to the rear end portion of the through shaft behind said spinner body.

3. A fish lure as set forth in claim 2 wherein the spinner body has a double thread, whereby to provide two circumferentially spaced thread end portions extending outwardly from the body on the front end thereof which are of greater width than the maximum width of the head, the said two threads affording increased purchase on the water when the lure is drawn through the water.

4. A fish lure comprising a longitudinally extending through shaft, a suitably enlarged head fixed on the front end portion of the shaft, an elongated externally threaded spinner body having a general appearance of being substantially frusto-conical, mounted for rotation on its longitudinal axis on the shaft behind the head with the large end toward the head, said threaded spinner body being of such shape that any section on a plane including the longitudinal axis will define a contour wherein the portion representing each thread will appear as a line substantially perpendicular to said longitudinal axis and a line inclined relative to the first line at a substantial angle to said axis, said spinner body being disposed so that the substantially perpendicular faces of the threads are on that side toward the head whereby to cause the spinner body to turn at an appreciable speed when the lure is drawn through the water, and fish hook means relative to which the spinner body turns attached to the rear end portion of the through shaft behind said spinner body.

5. A fish lure as set forth in claim 4 wherein the front end portion of the spinner body is larger in width than the maximum width of the head, whereby a portion of a thread projects outwardly beyond the periphery of the head, substantially as and for the purpose stated.

6. A fish lure as set forth in claim 4, wherein the front end portion of the spinner body is larger in width than the maximum width of the head, whereby a portion of the thread projects outwardly beyond the periphery of the head, the spinner body having a double thread, whereby to provide two circumferentially spaced thread portions projecting outwardly beyond the periphery of the head on the front end portion of the spinner body and affording increased purchase on the water when the lure is drawn through the water.

7. A fish lure, comprising a longitudinally extending through shaft, a suitably enlarged head fixed rigidly on the front end portion of the shaft, an elongated body having a general appearance of being of substantially circular cross section mounted for rotation on the shaft behind the head and having on its periphery a helix to cause the body to spin when drawn through the water, a plural-pronged hook member relative to which the body turns secured to the rear end portion of the shaft behind the body providing laterally spaced prongs on opposite sides of the extended longitudinal axis of the body, and a bait attaching means relative to which the body also turns also carried on the rear end portion of said shaft behind the body for trailing a piece of bait rearwardly with respect to the body substantially in a plane including the longitudinal axis of the body between the prongs, the laterally spaced prongs of the hook member projecting upwardly and the bait attaching means being disposed above the hook member, the plural-pronged hook member including a detachable prong having means for securing the same to the hook member substantially in the same vertical plane with the bait attaching means with the said detachable prong directed downwardly.

8. A fish lure, comprising a longitudinally extending through shaft, a suitably enlarged head on the front end portion of the shaft, an elongated body having a general appearance of being substantially frusto conical mounted for rotation on the shaft behind the head with the large end toward the head and having on its periphery a helix to cause the body to spin when drawn through the water, a plural-pronged hook member relative to which the body turns secured to the rear end portion of the shaft behind the body providing laterally spaced prongs on opposite sides of the extended longitudinal axis of the body, and a bait attaching means also carried on the rear end portion of said shaft behind the body for trailing a piece of bait rearwardly with respect to the body substantially in a plane including the longitudinal axis of the body between the prongs, the laterally spaced prongs of the hook member projecting upwardly and the bait attaching means being disposed above the hook member, the plural-pronged hook member including a detachable prong having means for securing the same to the hook member substantially in the same vertical plane with the bait attaching means with the said detachable prong directed downwardly.

9. A fish lure, comprising a longitudinally extending through shaft, an elongated externally threaded body mounted for rotation on its longitudinal axis on the shaft, the threads on said body causing the body to spin when the lure is drawn through the water, a plural-pronged hook member relative to which the body turns secured to the rear end portion of the through shaft behind the body providing laterally spaced prongs on opposite sides of the extended longitudinal axis of the body, and a bait attaching means also carried on the rear end portion of said shaft behind the body for trailing a piece of bait rearwardly with respect to the body substantially in a plane including the longitudinal axis of the body between the prongs, the laterally spaced prongs of the hook member projecting upwardly and the bait attaching means being disposed above the hook member, the hook member including a detachable prong having means for securing the same to the hook member substantially in the same vertical plane with the bait attaching means with the detachable prong directed downwardly.

WALTER L. ZINK.

REFERENCES CITED

The following references are of record in the file of this patent:

UNITED STATES PATENTS

| Number | Name | Date |
| --- | --- | --- |
| 1,803,777 | Speich | May 5, 1931 |
| 1,423,025 | Godgers et al. | July 18, 1922 |
| 1,978,875 | Wright | Oct. 30, 1934 |
| 1,923,623 | Hooge | Aug. 22, 1933 |
| 644,911 | Hedgeland | Mar. 6, 1900 |
| 830,404 | Barnes | Sept. 4, 1906 |
| 1,246,150 | Parr | Nov. 13, 1917 |
| 1,232,211 | Burkman | July 3, 1917 |
| 1,220,921 | Wilson | Mar. 27, 1917 |

FOREIGN PATENTS

| Number | Country | Date |
| --- | --- | --- |
| 22,000 | Great Britain | Sept. 27, 1909 |
| 612,352 | France | July 31, 1926 |